Sept. 18, 1962 C. W. GOODWIN ET AL 3,054,144
APPARATUS FOR MAKING PAPER CONTAINERS
Filed Jan. 23, 1959 6 Sheets-Sheet 1
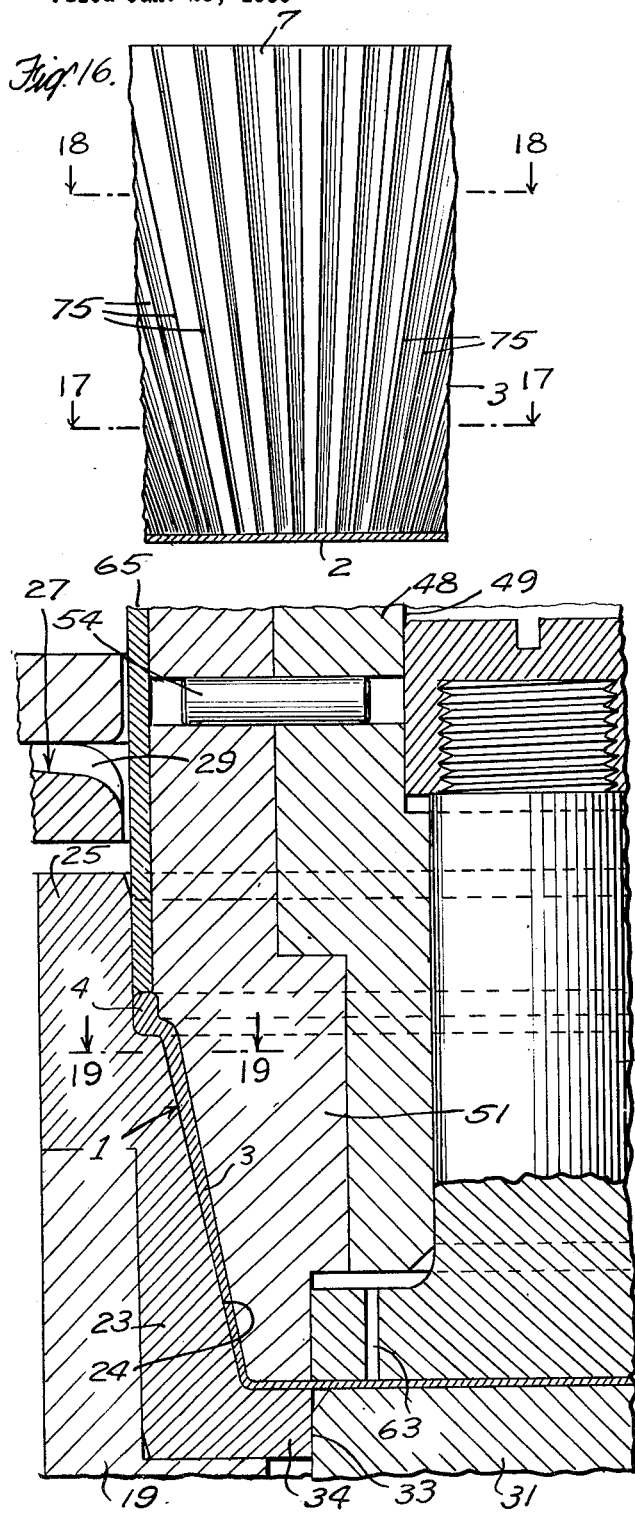
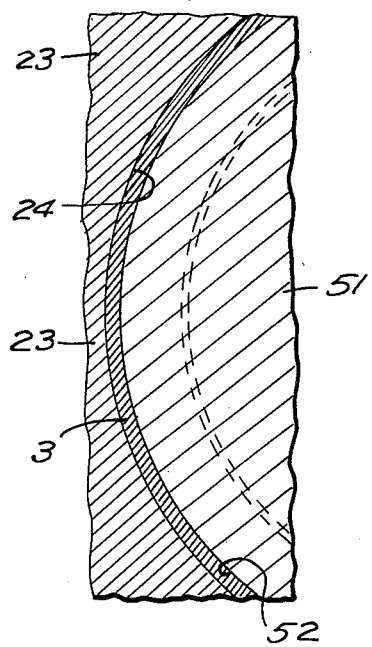
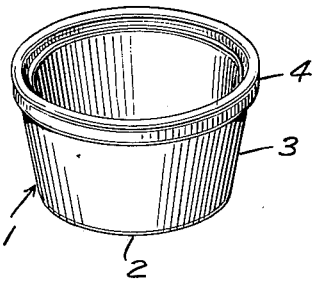
INVENTORS
CARL W. GOODWIN
JOHN P. CAMPANELLI
BY
ATTORNEY

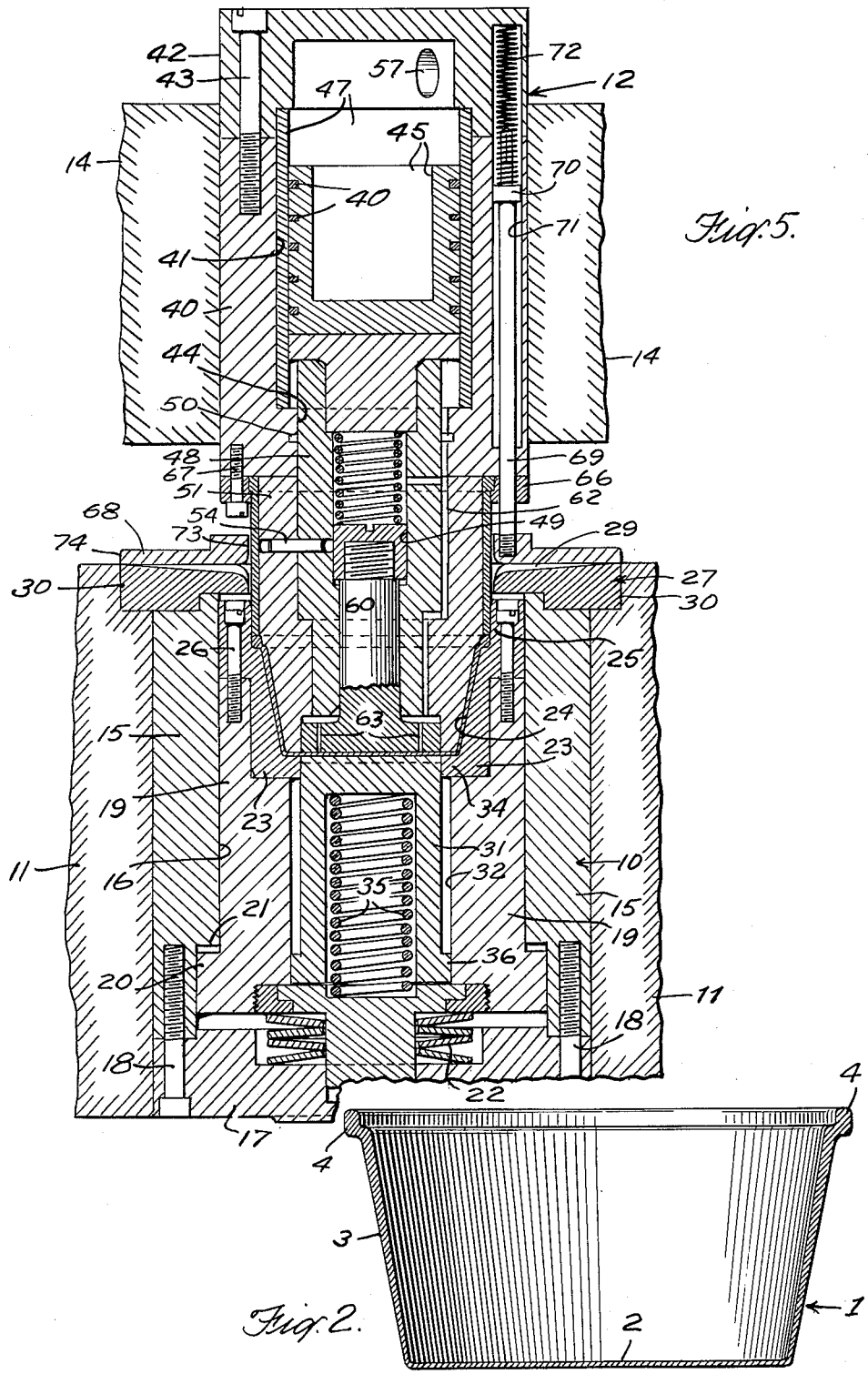

Sept. 18, 1962     C. W. GOODWIN ET AL     3,054,144
APPARATUS FOR MAKING PAPER CONTAINERS
Filed Jan. 23, 1959     6 Sheets-Sheet 3
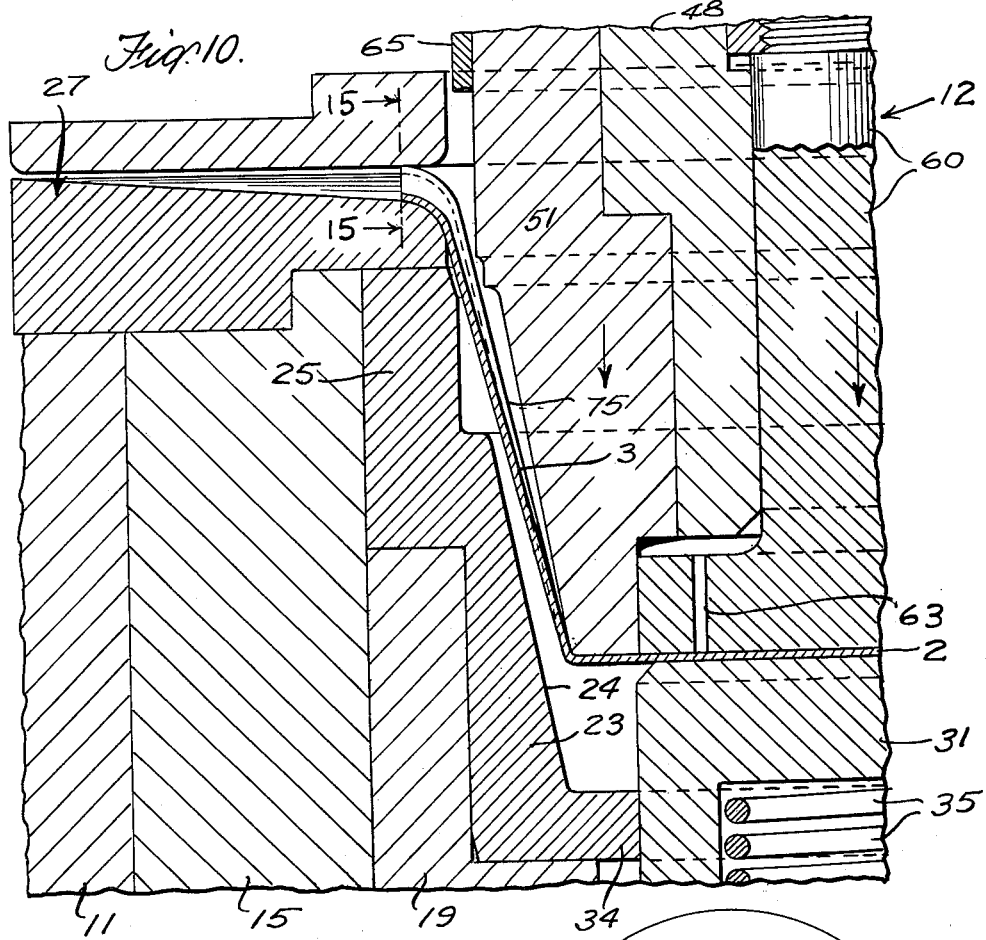
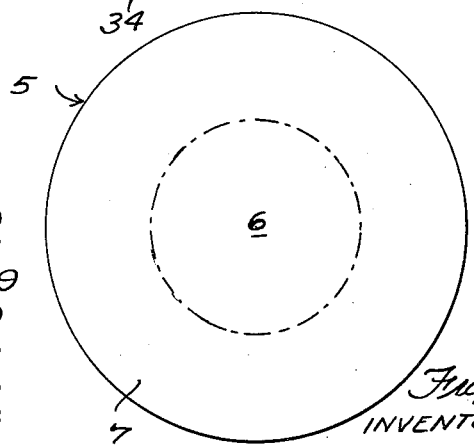
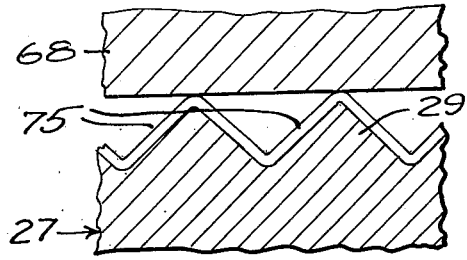
INVENTORS
CARL W. GOODWIN
JOHN P. CAMPANELLI
BY
ATTORNEY

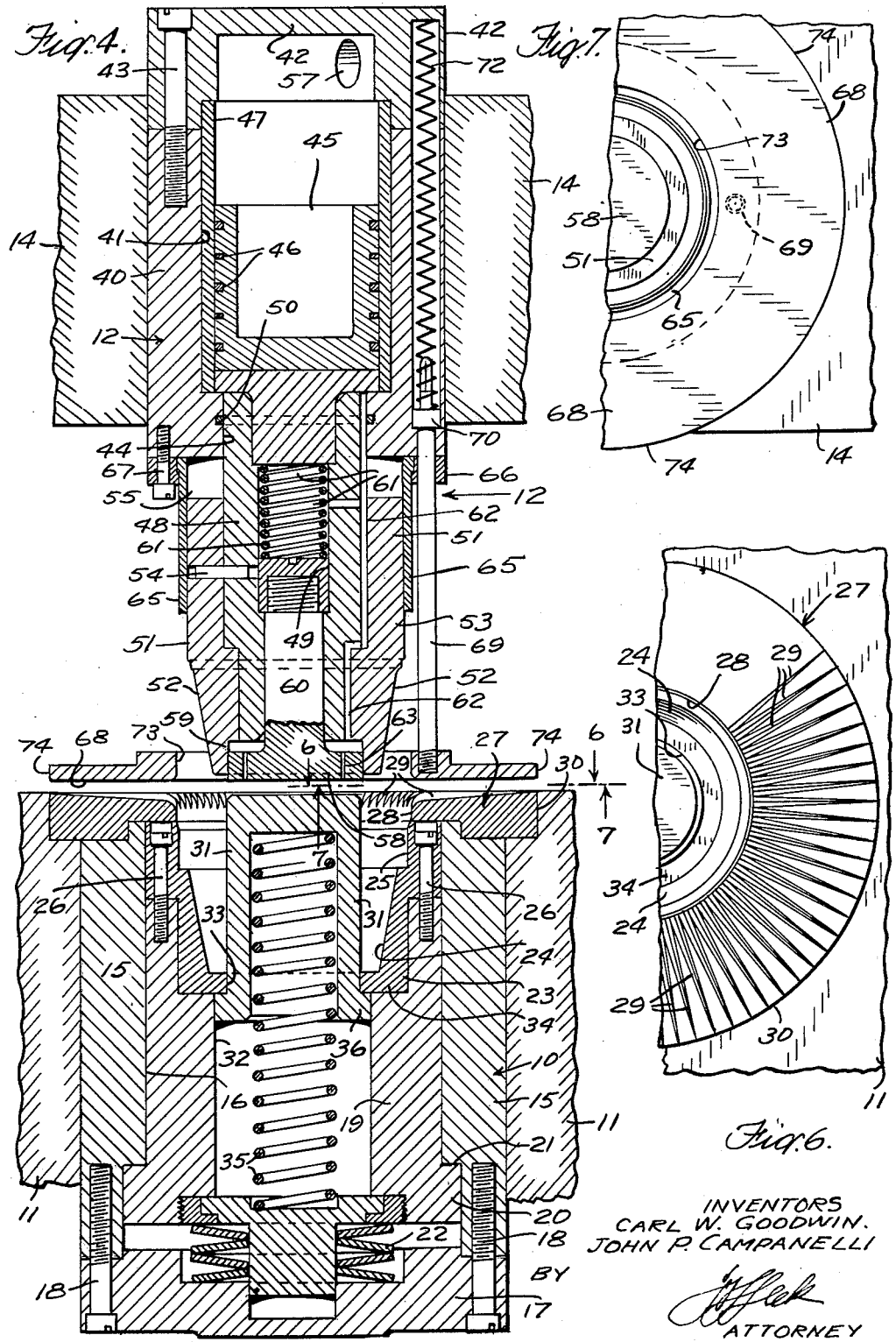

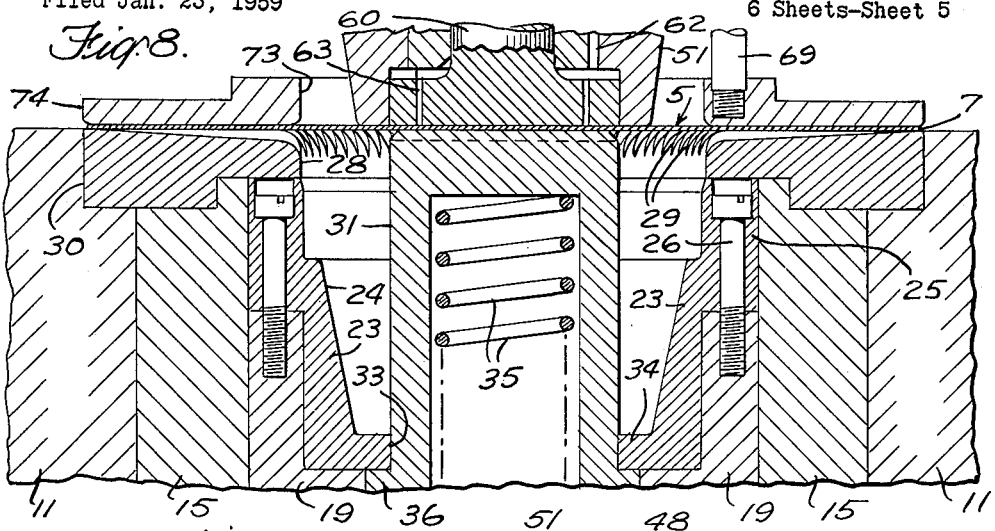
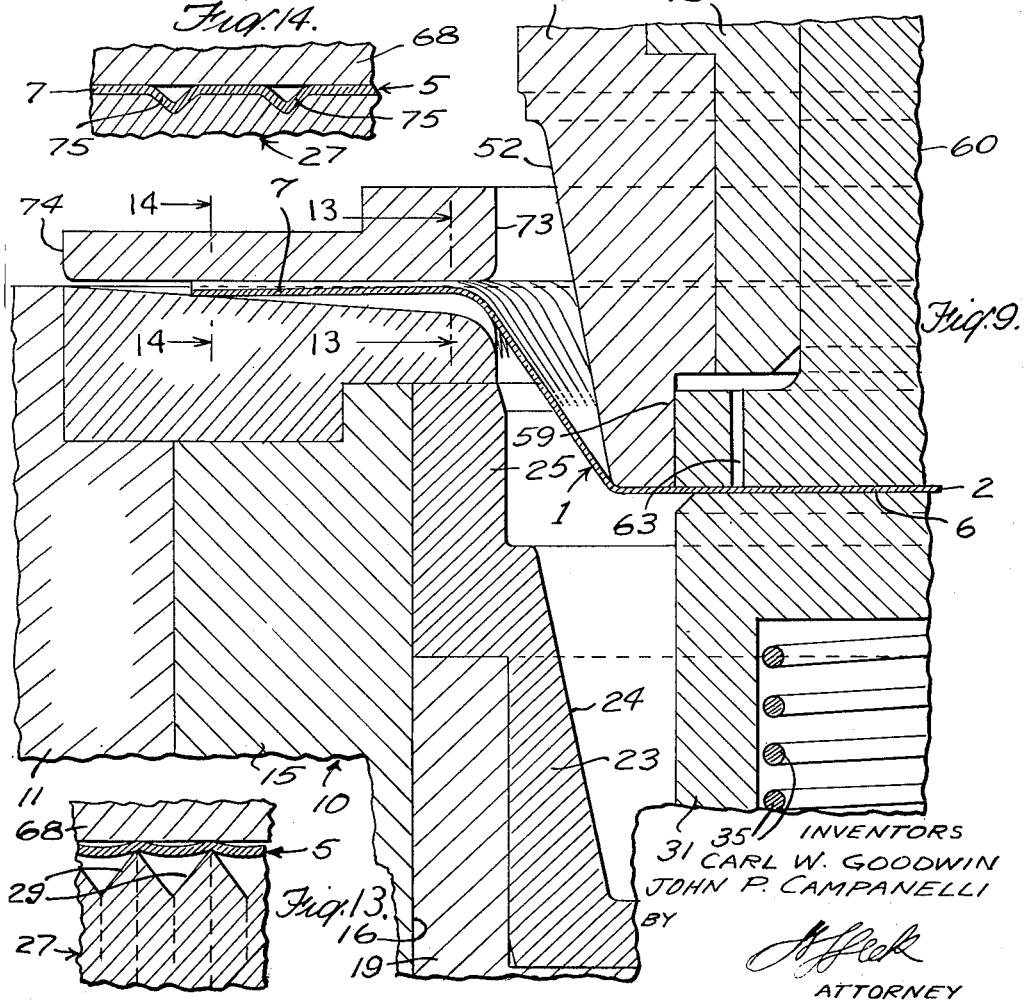

Sept. 18, 1962 C. W. GOODWIN ET AL 3,054,144
APPARATUS FOR MAKING PAPER CONTAINERS
Filed Jan. 23, 1959 6 Sheets-Sheet 6
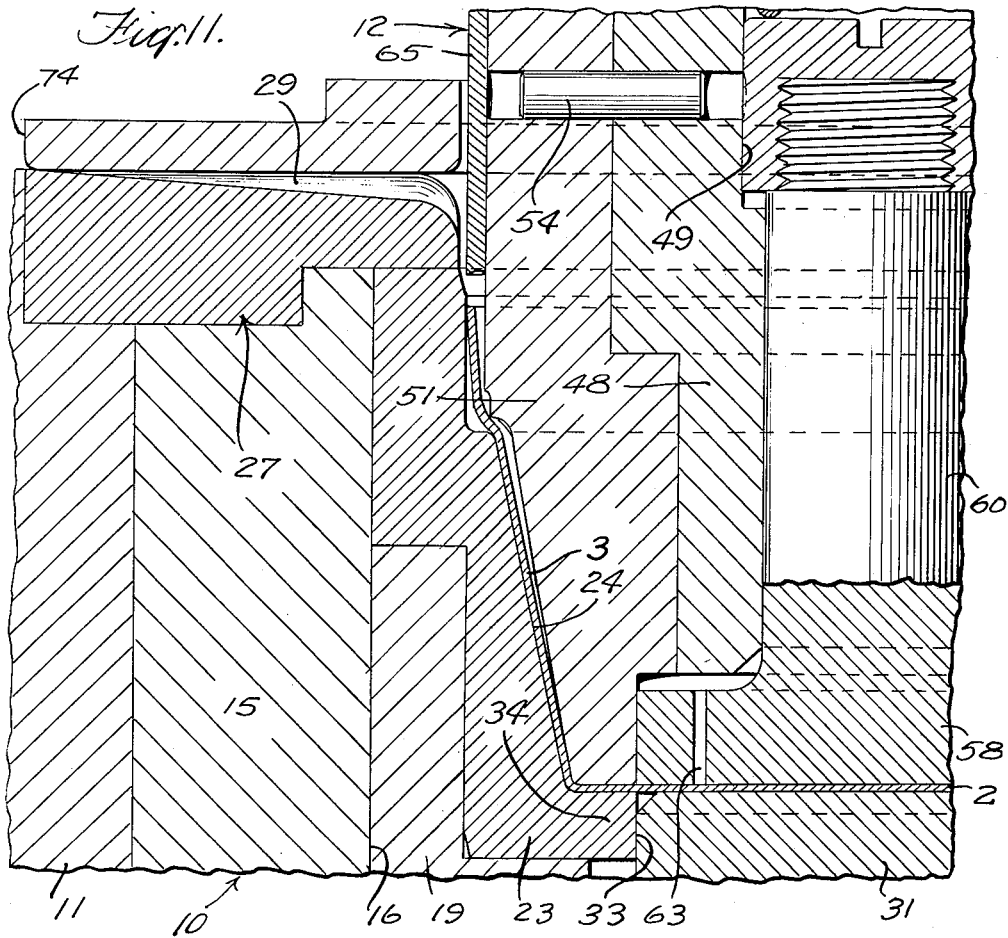
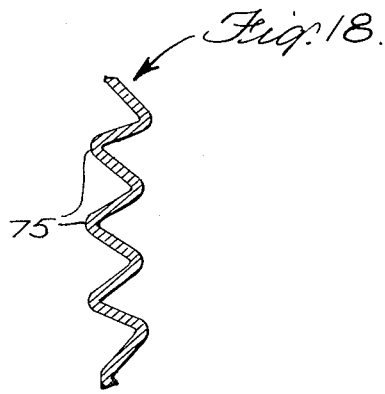
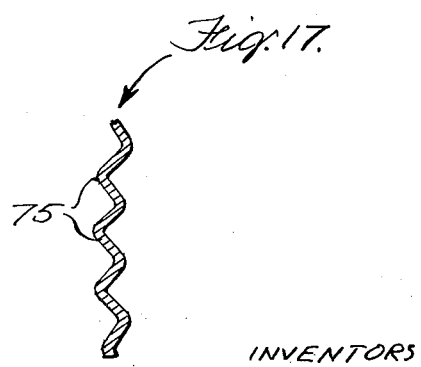
INVENTORS
CARL W. GOODWIN
JOHN P. CAMPANELLI
BY
ATTORNEY

United States Patent Office 3,054,144
Patented Sept. 18, 1962

3,054,144
APPARATUS FOR MAKING PAPER CONTAINERS
Carl W. Goodwin, North Plainfield, N.J., and John P. Campanelli, Levittown, N.Y., assignors to The American Seal-Kap Corporation of Delaware, New York, N.Y., a corporation of Delaware
Filed Jan. 23, 1959, Ser. No. 788,549
1 Claim. (Cl. 18—19)

This invention relates to an apparatus for producing paper receptacles from a single blank.

In accordance with the present invention the receptacle is formed from a single blank and comprises a bottom wall and an upwardly and slightly outwardly flaring annular side wall, integral with the bottom wall, which is of uniform thickness circumferentially and progressively increases in thickness upwardly from the bottom wall to the upper end of the side wall. The upper end of the side wall terminates in a compacted annular bead which is also integral with the bottom and side walls.

In producing the receptacle a blank of predetermined size and shape, depending on the size and shape of the receptacle to be formed, is first stamped from a sheet of paper stock. The stamped blank is then suitably treated in accordance with the intended use of the receptacle. One such method of treating the blank is disclosed in the patent to Baum No. 1,668,349, issued May 1, 1928. Another method of treating the blank is to laminate it with suitable ductile metal or plastic material.

The treated blank is then drawn down into a cup shaped die member by a complementary plunger. As the blank is drawn down into the die member the wall forming portion thereof is gathered into contiguous pleats of corrugations having hill and dale sections which progressively increase in width and depth from the bottom wall section to the upper end of the side wall section. After the blank has been drawn down and gathered into the die member by the plunger, continued downward movement of the plunger exerts a lateral pressure in the order of 8,000 to 10,000 pounds per square inch upon the side wall section which reduces it to a substantially homogeneous, dense structure with the fibrous material of the pleats or corrugations felted together. A heavy downward pressure is then applied to the upper end of the wall section which further compacts it and forms the annular bead about the upper end of the side wall sections. The progressive greater amount of gathered stock in the skirt section, upwardly from the bottom section, which is compacted during the forming operation causes the wall section of a finished receptacle to progressively increase in thickness from the bottom wall section upwardly to the upper end of the side wall section.

The apparatus by which the receptacle is formed consists of a lower die mechanism, which is adapted to be secured in stationary fixed position on the bed of a stamping press, and an upper die mechanism which is adapted to be secured to the ram of the press for vertical reciprocation therewith. The lower die mechanism comprises an upwardly and outwardly flaring cup shaped die having a draw ring disposed in fixed position about the upper end thereof. The upper surface of the draw ring is provided with radially extending contiguous grooves which progressively decrease in depth and width from the inner edge of the draw ring to the outer edge thereof. The upper die mechanism comprises a spring loaded blank holder by which the skirt section of a blank to be formed into a receptacle is yieldingly clamped between the draw ring and the blank holder, and a complementary cooperating plunger by which a blank is withdrawn from between the drawn ring and the blank holder and drawn down into the cup shaped die and is initially compressed and compacted therein. The grooved draw ring and the cooperating blank holder are operative to gather the skirt section of the blank into contiguous corrugations which progressively increase in depth and width outwardly of the blank from the central section to the periphery of the skirt section as the skirt section is being withdrawn from between the drawn ring and the cooperating blank holder by the plunger, down into said cup shaped die. The final downward movement of the plunger, as previously stated, compresses and compacts the corrugated skirt section of the blank.

A tubular plunger is disposed about the main plunger, which after the main plunger bottoms in the die, continues on downwardly into engagement with the upper end of the skirt section and further compresses and compacts it and interfelts the fibers thereof into a homogeneous, dense structure, and forms the compacted annular bead about the skirt section.

The principal object of the invention is to provide a simple and efficient apparatus for producing receptacles of the aforesaid character in accordance with the aforesaid method.

Having stated the principal objects of the invention, other and more limited objects thereof will be apparent from the following specification and the accompanying drawing forming a part thereof, in which:

FIG. 1 is a perspective view of a paper receptacle constructed in accordance with the present invention;

FIG. 2 is an enlarged central vertical section through the receptacle shown in FIG. 1;

FIG. 3 is a plan view of the blank from which the receptacle shown in FIGS. 1 and 2 is formed;

FIG. 4 is a central vertical section through the receptacle forming apparatus showing the plunger and blank holder being moved downwardly, and just prior to their engagement with a blank to be formed which is disposed on the draw ring;

FIG. 5 is a view similar to FIG. 4 showing the various parts of the apparatus in the relative positions they assume at the end of the forming stroke, and showing a completely formed receptacle therein;

FIG. 6 is a fragmentary top plan view of the cup shaped die and the associated draw ring, showing the contiguous radially extending V-shaped grooves, in the upper surface of the draw ring, which progressively decrease in depth and width from the inner edge of the draw ring to the outer edge thereof;

FIG. 7 is a fragmentary bottom plan view of the main forming plunger, the bead forming plunger, and the associated blank holder;

FIG. 8 is an enlarged fragmentary vertical sectional view showing the main plunger and blank holder in engagement with a blank, on the draw ring, just prior to drawing it down into the cup shaped die;

FIG. 9 is a view similar to FIG. 8 showing the blank partially withdrawn from between the draw ring and blank holder down into the die;

FIG. 10 is a view similar to FIGS. 8 and 9 showing the blank still further withdrawn from between the draw ring and the blank holder down into the die;

FIG. 11 is a view similar to FIGS. 8 to 10 showing the blank completely withdrawn from between the draw ring and blank holder down into the die, and the corrugations in the skirt section partially compressed and compacted between the main plunger and the die;

FIG. 12 is a view similar to FIGS. 8 to 11 showing the main and bead forming plungers at the limit of their downward strokes after having completely formed the receptacle, as shown therein and in FIGS. 1 and 2;

FIGS. 13 and 14 are fragmentary detail sectional views, taken respectively on the lines 13—13 and 14—14 on FIG. 9, showing the manner in which the skirt section of the blank is gathered into contiguous corrugations as it is withdrawn from between the draw ring and blank holder;

FIG. 15 is a detail sectional view taken on the line 15—15 of FIG. 10 showing the maximum depth and width of the skirt corrugations at the periphery of the skirt, just as the skirt leaves the draw ring and blank holder;

FIG. 16 is a fragmentary side elevation of the skirt section in the condition shown in FIG. 10;

FIGS. 17 and 18 are fragmentary horizontal detail sections through the skirt section as shown in FIGS. 10 and 16 showing the manner in which the corrugations progressively increase in depth and width from the bottom section outwardly, the planes of the sections being indicated respectively by the lines 17—17 and 18—18 on FIG. 16; and FIG. 19 is a detail horizontal section taken on the line 19—19 on FIG. 12 showing the skirt section compressed and compacted, and the fibers thereof interfelted into a homogeneous, dense structure.

Referring now to the drawings in detail by reference characters, the numeral 1 indicates a cup shaped receptacle, embodying my invention, which is produced by and in accordance with the apparatus and method disclosed herein. The receptacle 1 comprises a bottom wall 2 and an integral upwardly extending outwardly flaring annular side wall 3 which terminates in an enlarged annular integral bead 4 about the upper end thereof, and progressively increases in thickness from the bottom wall 2 upwardly to the bead 4 as clearly shown in FIGS. 2, 5 and 12. The receptacle 1 is formed from a single blank 5 having a central section 6, from which the bottom wall 2 is formed, and an annular skirt section 7, from which the annular side wall 3 and bead 4 are formed. The blank, which is stamped from a sheet of suitable stock, is first suitably treated, in accordance with the intended use of the receptacle, as previously stated herein, after which it is formed into the receptacle.

The apparatus by which the treated blank 5 is formed into the receptacle 1 comprises a lower die mechanism 10, which is secured in fixed stationary position in the bed 11 of a conventional stamping press, and a cooperating upper die mechanism 12, which is secured to the ram 14 of the press, for vertical reciprocation therewith.

The lower die mechanism 10 comprises a holder 15 having an open ended cylindrical bore 16, the lower end of which is removably secured to the bottom of the holder 15 by cap screws 18. A sleeve 19 having an annular flange 20 about the lower end thereof is slidably mounted in the bore 16 with the flange 20 normally engaging a shoulder 21 about the lower end of the bore 16, high pressure spring means 22 being provided between the cap 17 and the lower end of the sleeve 19 for yieldingly maintaining the flange 20 of the sleeve 19 in engagement with the shoulder 21 about the lower end of the bore 16.

A cup shaped die 23 having an upwardly extending outwardly flaring lower inner wall 24 which terminates in an offset straight cylindrical wall 25 is removably secured in the upper end of the sleeve 19 by cap screws 26. A draw ring 27 is suitably secured to the upper end of the holder 15 with the inner edge 28 thereof disposed in substantial alignment with the upper cylindrical wall 25 of the die member 23. The upper surface of the draw ring 27 is provided with contiguous V-shaped radially extending grooves 29 which progressively decrease in depth and width from the inner edge 28 thereof outwardly to the outer edge 30 thereof. An ejector 31 which is slidably mounted in the bore 32 of the sleeve 19 is biased upwardly through an aperture 33 in the bottom wall 34 of the die member 23 by a spring 35. The bottom of the ejector 31 is provided with an annular flange 36 which limits the upward movement of the ejector by engagement with the bottom wall 34 of the die member 23.

The upper die mechanism 12 comprises a holder 40 having a cylindrical bore 41 therein, the upper end of which is closed by a cap 42 which is removably secured to the holder 40 by cap screws 43. The lower end of the bore 41 communicates with an axially aligned bore 44, in the lower end of the holder 40, of slightly less diameter than the bore 41. A piston 45 provided with sealing rings 46 is slidably mounted in a hardened tubular cylinder 47 which is suitably secured in the bore 41 of the holder 40. The piston 45 is provided with a downwardly extending cylindrical extension 48, having an axial bore 49, which is suitably secured thereto as indicated at 50, and extends downwardly through the reduced bore 44 in the lower end of the holder 40. A main plunger 51, having a lower downwardly and inwardly flaring outer wall 52 which cooperates with the upwardly and outwardly flaring inner wall 24 of the die member 23 and an offset straight cylindrical section 53 thereabove which cooperates with the straight cylindrical wall 25 of the die member 23, is secured to the piston extension 48 as indicated at 54, with the upper end thereof normally downwardly spaced from the lower end of the holder 40 as shown at 55 in FIG. 4. The piston 45 is normally yieldingly held in its lowermost position, as shown in FIG. 4, by fluid under pressure which is admitted to the cylinder 47 above the piston 45 through an inlet port 57. A knockout 58 disposed in the recessed lower end 59 of the plunger 51 is provided with a shank 60 which is slidably mounted in the axial bore 49 of the piston extension 48. The knockout 58 is yieldingly biased downwardly by a spring 61, also disposed in the bore 49. Vent means for the underside of the piston 45 and the knockout 58 are shown at 62 and 63. A sleeve-like compression and bead forming plunger 65 which is disposed about the straight cylindrical section 53 of the main plunger 51 is removably secured to the lower end of the holder 40 by a retaining ring 66 and cap screws 67. A ring shaped blank holder 68 is secured to the lower ends of a plurality of rods 69 having heads 70 which are slidably mounted in complementary vertical bores 71 in the holder 40. Springs 72 in the bores 71 yieldingly hold the blank holder 68 in its lowermost position, as shown in FIG. 4, the heads 70 on the rods 69 serving to limit the downward movement of the blank holder 68 under the influence of the springs 72. The inner edge 73 of the blank holder 68 is disposed in vertical alignment with the inner edge 28 of the draw ring 27, and the outer edge 74 of the blank holder is disposed in substantially vertical alignment with the outer edge 30 of the draw ring.

In operation, a treated blank 5 is placed upon the draw ring 27, coaxially therewith, while the press ram 14 and the upper die mechanism 12 carried thereby are in their uppermost position. On the downward movement of the ram the central section 6 of the blank will first be gripped between the ejector 31 and the knockout 58 and skirt section 7 of the blank will be yieldingly gripped between the draw ring 27 and the blank holder 68 as shown in FIG. 8. As the main plunger 51 is moved on down, by the ram, through the positions shown in FIGS. 8 to 11, the blank holder will remain stationary, gripping the skirt 7 between it and the draw ring with a predetermined pressure as determined by the springs 72. During this downward movement of the plunger 51 the ejector 31 will recede, against the pressure of the spring 35, and the central section 6 of the blank will be moved straight downwardly into the die 23 and compressed against the bottom wall 34 thereof, thus forming the bottom 2 of the receptacle. At the same time the skirt section 7 of the blank will be withdrawn from between the draw ring 27 and the blank holder 68 down into the die 23 between the inner wall 24 thereof and the outer wall 52 of the plunger 51, thus forming the annular side wall 3 of the receptacle.

As the skirt section 7 of the blank 5 is drawn from between the draw ring 27 and blank holder 68 down into the die 23, the grooves 29 of the draw ring 27 gather the skirt section into radially extending contiguous corrugations 75 which progressively increase in depth and width, as clearly shown in FIGS. 13 to 18, from the bottom section 6 outwardly to the periphery of the skirt section 7. This increase in depth and width of the corrugations 75 is due to the fact that the closer to the periphery of the skirt 7, the greater amount of skirt stock that must be gathered as the skirt section 7 of the blank 5 is formed upwardly about the central section 6 thereof. This also accounts for the annular side wall 3 of the receptacle 1 progressively increasing in thickness upwardly from the bottom wall 2 thereof. In some instances such as in connection with relatively deep containers the blank may be pre-creased before being inserted into the forming press and may then be positioned on the draw ring with the creases in registration with the grooves in the draw ring. As the plunger 51 is moved on down from the position shown in FIG. 10 to the position shown in FIG. 11, the corrugations 75 are initially compressed and compacted between the tapered outer wall 52 of the plunger 51 and the tapered inner wall 24 of the die 23.

After the main plunger 51 bottoms, as shown in FIG. 11, it will remain stationary while the ram 14 continues to move the holder 40 and the sleeve-like compression and bead forming plunger 65 secured thereto on down from the position shown in FIG. 11 to the position shown in FIGS. 5 and 12. During this further downward movement of the plunger 65 it engages the upper edge of the skirt section 7 and compresses and compacts it from the position shown in FIG. 11 to the position shown in FIG. 12, thus forming the bead 4 of the receptacle 1. At the same time, it further compresses and compacts the corrugated section of the skirt between the plunger and die walls 52 and 24 respectively into a homogeneous, dense structure with the fibers thereof interfelted together.

During the further downward movement of the ram 14 the plunger 51 is firmly held in its bottomed positioned by the fluid pressure acting upon the piston 45 in the cylinder 47; and the spring means 22 is provided to permit the sleeve 19 and the parts carried thereby to be moved slightly downwardly in the event that the upper die mechanism 12 is not accurately positioned in the press ram 14 with respect to the position of the lower die mechanism 10 in the bed 11 of the press.

Having thus described my invention, it will be evident, to those skilled in this art, from the foregoing description of the receptacle and the method and apparatus for making the same, that various changes and modifications may be made therein within the spirit of the invention and the scope of the appended claim.

We claim:

An apparatus for producing a paper receptacle, having a bottom wall and an annular upwardly extending side wall which progressively increases in thickness upwardly from said bottom wall and terminates in an enlarged annular bead about the upper end of the side wall, from a single treated paper blank having a central section from which the bottom wall of said receptacle is formed and a skirt section from which the side wall of said receptacle is formed, said apparatus comprising; a lower die mechanism which is adapted to be secured in fixed stationary position on the bed of a stamping press, an upper cooperating die mechanism which is adapted to be secured to the ram of said press for vertical reciprocation therewith; said lower die mechanism comprising a cup shaped die having an upwardly extending outwardly flaring tapered inner wall which terminates in an offset straight cylindrical inner wall with an annular connecting shoulder therebetween, and a draw ring secured in fixed position about the upper end of said cup shaped die; said upper die mechanism comprising a spring loaded blank holder which cooperates with said draw ring to yieldingly hold the skirt section of a blank to be formed therebetween, and a pressure loaded yieldable main plunger having an upwardly and outwardly flaring tapered outer wall which terminates in a straight cylindrical outer wall with an annular connecting shoulder therebetween, the taper of the outer wall of said plunger being less than the taper of the inner wall of said cup shaped die, said plunger and said cup shaped die cooperating with each other when said plunger is at the lower limit of its movement to provide an annular chamber between the tapered walls thereof which progressively increases in thickness upwardly between the lower and upper ends thereof, said main plunger being operative to withdraw the skirt section of a blank to be formed from between said draw ring and said blank holder down into said annular chamber where it is radially compressed, compacted and interfelted into a dense homogeneous structure forming the side wall of said container; the upper surface of said draw ring being provided with radially extending contiguous grooves which progressively decrease in depth and width from the inner edge of said draw ring to the outer edge thereof, said draw ring and said cooperating blank holder being operative to gather the skirt section of said blank into contiguous corrugations which progressively increase in depth and width from said central section to the outer edge of said skirt section as said skirt section is being withdrawn from between said draw ring and said blank holder down into said cup shaped die by said main plunger; the upward progressively increasing thickness of said annular chamber conforming to the progressively increasing amount of skirt stock between the central bottom forming section of a blank and the outer periphery thereof which is corrugated and drawn down into said cup shaped die to form the side wall of said receptacle.

References Cited in the file of this patent

UNITED STATES PATENTS

| | | |
|---|---|---|
| 448,748 | Comings | Mar. 24, 1891 |
| 891,642 | Tietzmann | June 23, 1908 |
| 1,760,288 | Stevens | May 27, 1930 |
| 2,131,438 | Jensen | Sept. 27, 1938 |
| 2,337,581 | Wiley | Dec. 28, 1943 |
| 2,348,871 | Wiley | May 16, 1944 |
| 2,377,351 | Martin | June 5, 1945 |
| 2,382,873 | Goodwin | Aug. 14, 1945 |
| 2,691,188 | Goodfellow | Oct. 12, 1954 |